Oct. 1, 1968 F. M. HAYDEN 3,404,307

SWITCH-OPERATED COLOR TELEVISION DEMAGNETIZATION SYSTEM

Filed March 3, 1965 2 Sheets-Sheet 1

INVENTOR.
Fred M. Hayden

By Smyth, Roston & Pavitt
Attorneys

INVENTOR.
Fred M. Hayden
By Smyth, Roston & Pavitt
Attorneys 3,404,307
SWITCH-OPERATED COLOR TELEVISION DEMAGNETIZATION SYSTEM Fred M. Hayden, Sherman Oaks, Calif., assignor to Packard-Bell Electronics Corporation, Los Angeles, Calif., a corporation of California Filed Mar. 3, 1965, Ser. No. 436,731
12 Claims. (Cl. 315—8)

This invention relates in general to television receivers and in particular to an improved demagnetization or degaussing system therein.

The central element in a television receiver is a cathode-ray tube having a display face with phosphors coated on the inside. A combined electron-gun and magnetic-deflection "sweep" system behind the display face passes a variable-intensity electron beam across the phosphors in a fixed pattern, repeatedly crossing the display face from left to right in successively lower transverse video "lines." In color television reception, three electron guns are used to produce three distinct electron beams; and between the guns and the display face is placed a metal shadow mask having apertures which permit electrons from each gun to strike only those phosphors on the display face of one primary color—red, blue or green. Especially when a shadow mask is used, spurious magnetic fields on the metal components of receiving tubes deflect the electron beams, so that they do not energize the phosphors on the display face in the exact time-position pattern required to reproduce faithfully the picture embodiment in the incoming video signal.

Before the advent of color television, spurious magnetization problems were handled by TV repairmen, using a special "degaussing" or demagnetization coil to remove residual magnetization from tube components. However, the shadow mask in the new color television receivers is so magnetism-sensitive that degaussing becomes necessary whenever the receiving set is altered in its position relative to the earth's magnetic field, the main source of set component residual magnetism. Accordingly, numerous integral degaussing systems have been tried, with varying degrees of success. The main object of such a system is to provide a demagnetization signal (i.e., an alternating current (AC) signal beginning at a high enough initial amplitude to saturate the elements being degaussed, then fading gradually to zero) across the display face of the tube in the vertical plane, which is the plane in which the earth's magnetic field has its most disrupting effect. The general object of the instant invention is to provide an improved television receiver demagnetization system.

Another object of this invention is to provide an improved television receiver demagnetization system having no limit as to deliverable power.

Another object of this invention is to provide an improved television receiver demagnetization system which is inexpensive to build and which facilitates a minimum increase of the weight, bulkiness and complexity of the receiving set.

In the achievement of the above and other objects and as a feature of applicant's invention, there is provided a television receiver degaussing system having coils mounted upon the picture tube shield and oriented to pass maximal magnetic flux in the vertical plane of the receiver.

Another feature of applicant's invention is to provide energization circuit for the degaussing coils whereby AC power from some outside source is directed into the coils and the fading effect necessary for degaussing is achieved by coupling in series with the coils a rectifier which converts the AC power into variable DC which is fed to a charging capacitor. Upon the closing of a switch, automatic or manual, the AC power passes through the degaussing coils at peak voltage; but as the charge across the charging capacitor increases, the current in the degaussing coils declines until it is almost non-existent. By switching the charging capacitor into some passive network such as a simple resistor, it can be discharged preparatory to repetition of the degaussing signal.

As another feature of applicant's invention, the degaussing coils are switched into series combination with the rectification and filtering network already present in all television receivers and use power from the main power transformer already present in present television receivers, in order to minimize the danger of electrical shock to persons manipulating the degaussing system switches and to utilize existing circuit elements.

Other objects and features of this invention and a better understanding thereof may be had by referring to the following description and claims taken in conjunction with the accompanying drawings in which:

Figure 1:
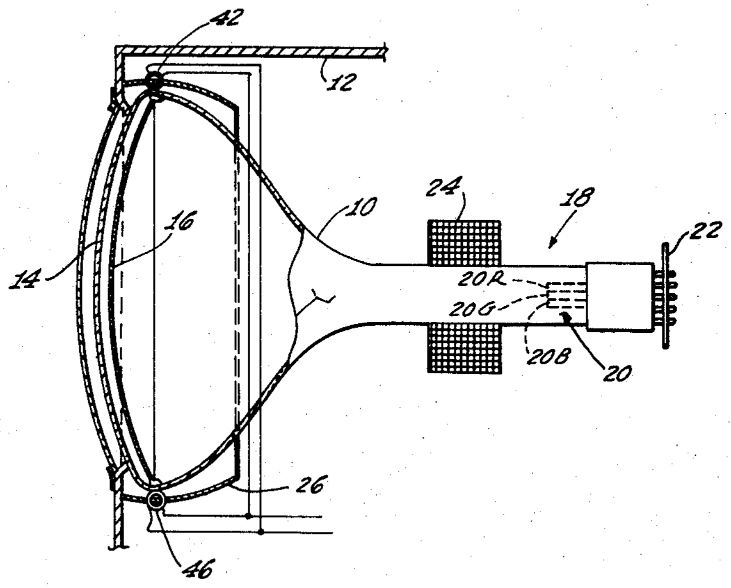
FIGURE 1 is a side elevation in section of a color television receiver in which the invention of the instant application is embodied.

Referring to FIGURE 1, a color television receiver in which the principles of applicant's invention are embodied is constructed around a cathode-ray "picture" tube 10 enclosed in a casing 12. The function of the tube 10 is to produce pictures on the front of a display face 14, the inside surface of which is coated with phosphors which are caused to luminescence by an electron beam in a manner well known to those skilled in the television art. In the practice of color television reception, a shadow mask 16 is mounted adjacent to the inside surface of the display face 14. At the opposite end of the tube 10 from the display face 14 and shadow mask 16 is a neck portion 18 containing elements of the tube 10 whereby an electron beam is made to scan the inside of the display face 14. The electron beams are generated by electron guns shown at 20. In color television receivers, there is one electron gun for each separate primary color, red, green and blue, used in the phosphor coating on the inside of the display face 14. Electrical signals derived from the TV broadcast signal received by the television set are coupled through a plug 22 into the tube 10 where they vary the strength of the electron stream emitted by each gun 20R, 20G or 20B. A deflection yoke 24 varies the magnetic field in the neck 18 so that the electron beams emitting from the electron guns 20 are changeably deflected both horizontally and vertically in such a manner that each beam (from 20R, 20G or 20B) is made to sweep the phosphor-coated inner face of the display tube 14 according to a carefully controlled pattern. Surrounding the picture tube 10 is a shield 26 which minimizes the effect of outside electrical or magnetic fields on the path of the electron beams from the guns 20, thus contributing to the accuracy and controllability of the sweep.

Figure 2:
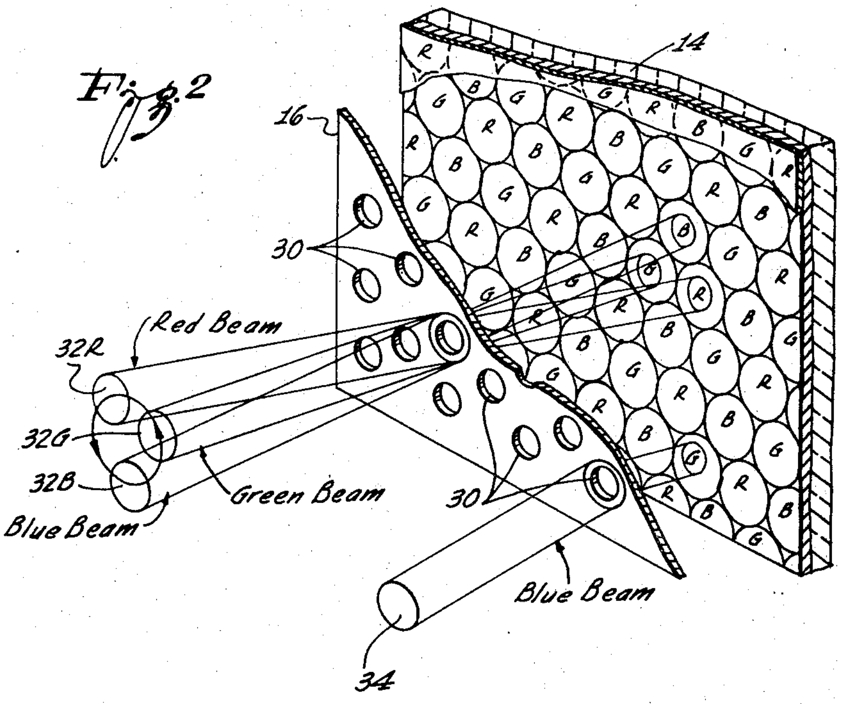
FIGURE 2 is a schematic illustrating the principles of color television reception using a shadow mask.

FIGURE 2 illustrates the effects of beams from the electron guns on the phosphor coating of the inside surface of the display face 14. This phosphor coating is composed of regularly spaced clusters, each of which contains one portion for each of the primary colors (R, G and B). Each of these R, B or G portions will luminesce under the influence of electrons from the guns 20. In order that electrons from each gun will cause only phosphor portions of that gun's corresponding color to luminescence, the shadow mask 16 is provided with apertures 30 so positioned that beams from each gun 20R, 20G or 20B will hit only phosphor portions of the corresponding colors (R, B or G) and will be masked from the phosphor portions of the other two colors. Thus, in the operation of the cathode-ray display tube 10, an electron stream 32R from the red electron gun 20R will pass through the apertures 30 only to red portions of the phosphor coating and will be masked from all blue or green portions. In like manner, the electron beam from the blue gun 32B will strike only B portions of the phosphor, and the beam from the green gun 32G will strike only G portions.

The present invention relates to a problem arising when the shadow mask 16, the shield 26, or other portions of the television receiving set acquire unwanted magnetic properties that introduce undesirable deflection into the electron streams 32. For example, a magnetic field in the shadow mask 16 could cause an electron beam such as is shown at 34 as having been emitted from the blue gun 20B to strike one of the other two phosphors R or G, at least in part. To avoid such distortions of the electron beams 32, various "degaussing" systems have been used on television receivers. The present invention sets forth a new and more effective system for degaussing the shadow mask 16, shield 26 and other portions of the forward part of the tube 10.

Figure 3:
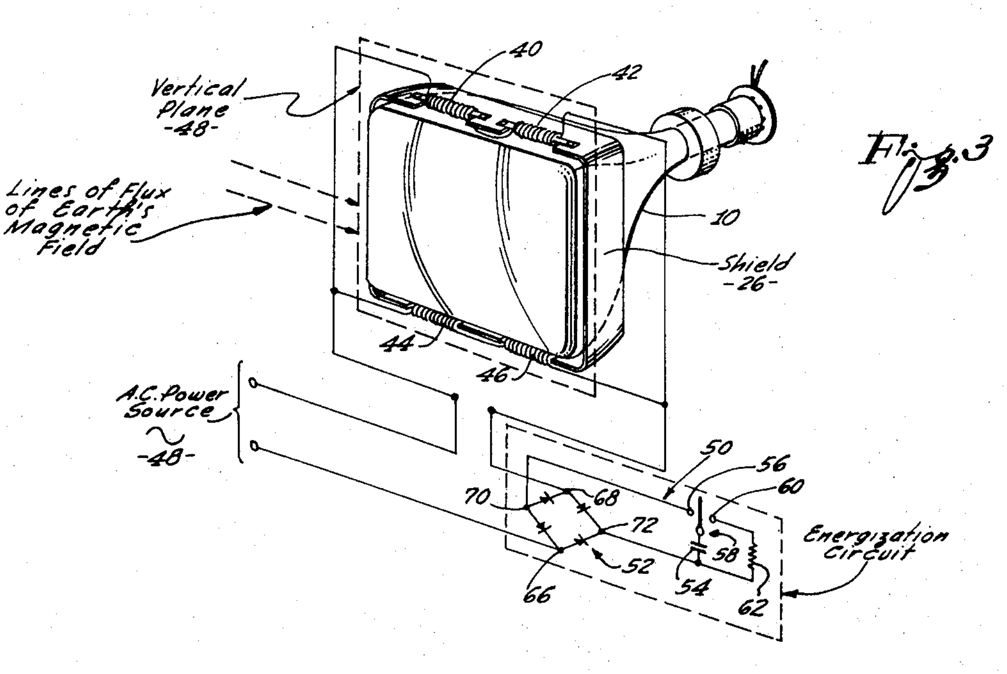
FIGURE 3 is a schematic illustration of a shield and shadow mask degaussing system according to the principles of the instant invention.

Referring to FIGURE 3, the tube 10 is shown sheathed in the shield 26. At the forward end of the tube 10 near the display face 14 are coils 40, 42, 44 and 46, which for ease of construction may be mounted on the forward edge of the shield 26. The passing of an electrical current through the coils 40, 42, 44 and 46 will cause a magnetic field to arise therethrough. The passing of an alternating electrical current through the coils 40 to 46 will result in an alternating magnetic field. The magnetic lines of flux from each end of the coil to the other will be led mainly through the shadow mask 16 and the shield 26 (because these two components are the most substantial metallic bodies in the region of the coils 40 to 46) resulting in the degaussing thereof. It should be noted that the main magnetic effect of the coils 40–46 is only in the vertical plane 48 of the tube 10, that is to say—the plane parallel to the display face 14. This is because the main source of unwanted magnetism in the elements of the tube 10 is the earth's magnetic field, the lines of flux of which pass transversely through the vertical plane 48.

A desirable pattern for a degaussing or demagnetization signal is that of diminishing AC, i.e.—an AC signal of a certain frequency is applied initially at high amplitude and then declines or fades in amplitude over a certain period of time. Before the advent of color television, degaussing was usually done by a television repairman using a special degaussing coil. Once a certain television set had been placed in a position that was expected to be relatively permanent, the repairman would energize the degaussing coil and hold it very close to all portions of the display face 14 of the picture tube 10, then gradually withdraw it.

In the degaussing system illustrated in FIGURE 3, the AC signal is supplied from any AC power source 48 and is coupled across the series combination of the coil 40 and the coil 42 at the top of the display face 14. The series combination of the coils 40 and 42 are wound in the same sense, so that they are coupled in series-aiding; that is to say, the lines of magnetic flux from the coils 40 and 42 are in the same direction rather than opposing each other. The coils 44 and 46 are similarly wound in series-aiding arrangement relative to each other and are wound relative to coils 40 and 42 in such a manner that the magnetic poles of the 40–42 series and the magnetic poles of the 44–46 series are at the same ends, making the lines of flux from each series mutually repellent.

In order to achieve the fading-out effect of the degaussing signal, the coils 40–46 are coupled in series with an energization circuit 50, or more particularly—the input terminals of a bridge rectifier 52 therein. One output terminal of the bridge rectifier 52 is coupled to a first plate of a capacitor 54. The other output terminal of the bridge rectifier 52 is coupled to one fixed contact 56 of a switch 58, the movable contact of which is coupled to a second plate of the capacitor 54. The second fixed contact 60 of the switch 58 is coupled through a resistor 62 to the first plate of the capacitor 54.

In the operation of the circuit shown in FIGURE 3, the degaussing of the tube 10 begins when the movable contact of the switch 58 is first closed with the terminal 56. Then AC power from the source 48 flows through the coils 40 to 46 and is rectified at 52 to feed a variable DC current into the capacitor 54. As the capacitor 54 accumulates charge, the voltage across the output terminals 70 and 72 of the rectifier 52 will build up until it becomes equal to the peak voltage of the AC power source 48 and thus prevents the passage of any current through the bridge diodes. This will result in a degauss-signal in the coils 40–46 ranging from an initial level determined by the peak of the AC power source 48 down to zero at the time when the voltage at the output terminals 70 and 72 of the rectifier is maximum. Once this degaussing cycle has been performed, the capacitor 54 can be discharged to the resistor 62 by switching to the fixed contact 60 of the switch 58.

Figure 4:
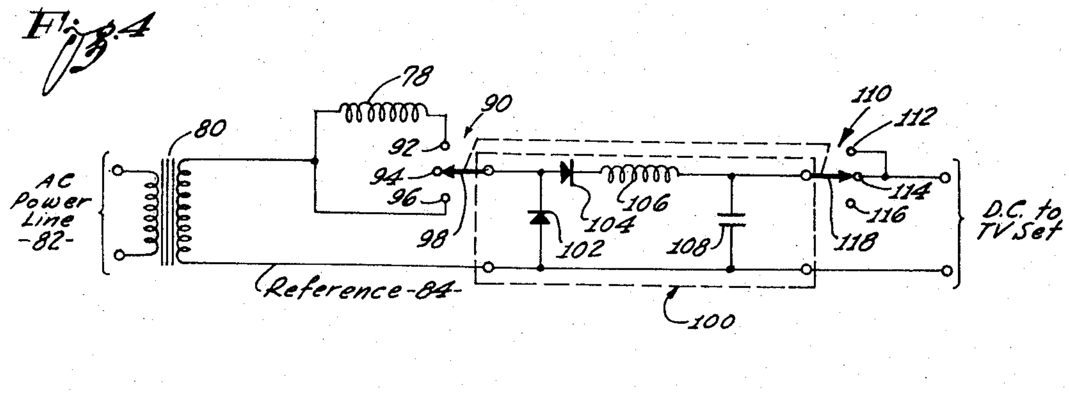
FIGURE 4 is a schematic of an improved excitation circuit according to the principles of the instant invention.

The circuit shown in FIGURE 4 is designed to supply a degaussing signal in the same manner as the circuit just described and shown in FIGURE 3; however, it utilizes circuit components already present in the television receiver for other purposes, rather than adding on the additional components described in connection with the energization circuit 50 of FIGURE 3. The coils 40–46 of FIGURE 3 are represented at 78 in FIGURE 4 as a single coil having its first end connected to a first end of the secondary of a transformer 80 which is the main power transformer of the television receiver. The primary of the transformer 80 is coupled across an AC power source 82 and the second end of the secondary of the transformer 80 can be said to constitute the reference point or line 84 of the circuit of FIGURE 4. A first switch 90 in that circuit has three fixed contacts 92, 94 and 96 and a movable contact 98. The contact 92 is coupled to the second end of the coil 78; the contact 94 is blank; and the contact 96 is directly coupled to the first end of the secondary of the transformer 80. The movable contact 98 is coupled to the rectifying and filtering circuitry of the television receiver shown symbolically at 100, where two diodes 102 and 104 represent the rectifying elements and an inductor 106 and a capacitor 108 form a simple filter. A second switch 110 having fixed contacts 112, 114, and 116 and having a movable contact 118 has its movable contact 118 coupled to the output of the rectifying and filtering network 100. The movable contacts 98 and 118 are ganged. The fixed contacts 112 and 114 are joined together and are coupled to supply DC current to various points in the television receiver. The fixed contact 116 is blank.

In the operation of the circuit shown in FIGURE 4, when the movable contact 98 is closed to the fixed contact 92 and the movable contact 118 is closed to the blank contact 116, AC current will flow through the degaussing coils represented at 78, will be rectified at 102, 104, and will gradually charge up the capacitor 108 until such time as further current flow is blocked, thus permitting degaussing to be performed using the rectification and filtering circuit 100 in place of the energization circuit 50 of FIGURE 3. For normal operation of the television set, movable contact 98 is closed to the fixed contact 96 and the movable contact 118 is closed to the fixed contact 112. Preliminary to running through the degaussing cycle, the capacitor 108 may be discharged by setting the movable contact 98 closed to the fixed contact 94 (blank) and setting the movable contact 118 closed to the fixed contact 114 so that the charge on the capacitor 108 is dissipated by running a current through the various circuit elements inside the television receiver.

Thus, applicant has achieved an improved television receiver demagnetization system which is unlimited as to deliverable power (since it derives its power directly from an outside power source), is inexpensive to build, and necessitates little increase in the weight, bulkiness or complexity of the receiving set.

While only a limited number of embodiments have been disclosed herein, it will be readily apparent to persons skilled in the art that numerous changes and modifications may be made without departing from the spirit of the invention. Accordingly, the foregoing disclosure is for illustrative purposes only and does not limit the invention which is defined only by the claims that follow.

What is claimed is:

1. A television receiving set comprising a picture tube having a display face, a shield mounted in proximity to the picture tube, first and second coils mounted on the shield above the display face of the picture tube and wound and coupled in series-aiding configuration, third and fourth coils mounted on the shield below the display face of the picture tube and wound and coupled in series-aiding configuration, the pair comprising the first and second coils and the pair comprising the third and fourth coils being arranged relative to each other in such manner that their magnetic poles are opposed, a source of AC power coupled across a primary of a power transformer having primary and secondary windings, each such winding having a first terminal and a second terminal, the first terminal of the secondary of the power transformer being coupled to a first end of the first pair of coils and a first end of the second pair of coils, a receiving set rectifier having first and second input terminals and first and second output terminals, the first input terminal of the receiving set rectifier being switchable by a first switch between a connection both to a second end of the first pair of coils and to a second end of the second pair of coils or alternatively a direct connection to the first terminal of the secondary of the power transformer, the second input terminal of the receiving set rectifier being coupled to the second terminal of the secondary of the power transformer, a receiving set DC smoothing filter including at least one capacitor having first and second plates, the first plate of the capacitor being coupled to the first output terminal of the receiving set rectifier, and a second switch having a movable contact and a fixed contact, the movable contact of the second switch being coupled to the output terminal of the receiving set filter and the fixed contact of the second switch being coupled to the receiving set DC utilization circuitry.

2. A television receiving set comprising a picture tube having a display face, a shield mounted in proximity to the picture tube, a first coil mounted on the shield above the display face of the picture tube, a second coil mounted on the shield below the display face of the picture tube, the first and second coils being arranged relative to each other in such manner that their magnetic poles are opposed, a source of AC power having a first terminal and a second terminal, the first terminal of the source of AC power being coupled to a first terminal of the first coil and a first terminal of the second coil, a diode bridge rectifier having first and second input terminals and first and second output terminals, the first input terminal of the diode bridge rectifier being coupled both to a second terminal of the first coil and to a second terminal of the second coil, the second input terminal of the diode bridge rectifier being coupled to the second terminal of the source of AC power, a storage capacitor having first and second plates, the first plate of the storage capacitor being coupled to the first output terminal of the diode bridge rectifier, a switch having a movable contact and first and second fixed contacts, the movable contact of the switch being coupled to the second plate of the charging capacitor, the first fixed contact of the switch being coupled to the second output terminal of the diode bridge rectifier, and a resistor having first and second terminals, the first terminal of the resistor being coupled to the first plate of the charging capacitor and the second terminal of the resistor being coupled to the second fixed contact of the switch.

3. A demagnetization system for a television receiving set having a picture tube with a display face and a shield mounted around the picture tube comprising: a first coil mounted on the shield above the display face of the picture tube; a second coil mounted on the shield below the display face of the picture tube; the first and second coils being arranged relative to each other in such a manner that their magnetic poles are opposed; a source of AC power coupled to a first end of the first coil and a first end of the second coil; a rectifier means coupled to a second end of the first coil and a second end of the second coil; a storage capacitor having a first plate coupled to a first output terminal of the rectifier means; a resistor having a first end coupled to the first plate of the capacitor; and means for switching a second plate of the capacitor between connection with a second output terminal of the rectifier means and connection with a second end of the resistor.

4. In combination for degaussing a television tube,
means for providing an alternating current,
a shadow mask disposed in contiguous relationship to the television tube,
at least one demagnetizing coil disposed relative to the shadow mask to introduce a magnetic flux of decaying alternating characteristics to the tube to demagnetize the tube,
rectifying means,
an energy storage member,
discharge means for discharging the energy in the energy storage member,
a switch having a movable contact and first and second stationary contacts for alternate engagement by the movable contact,
means connecting the alternating current means, the demagnetizing coil, the rectifying means and the energy storage means and the movable contact and the first stationary contact of the switch in a first circuit, upon an engagement between the movable contact and the first stationary contact of the switch, to produce a flow of alternating current of decaying characteristics through the demagnetizing coil and a charging of the energy storage member, and
means connecting the energy storage means and the discharge means and the movable contact and the second stationary contact of the switch in a second electrical circuit, upon an engagement between the movable contact and the second stationary contact of the switch, to produce a discharge of the energy storage means through the discharge means.

5. The combination set forth in claim 4 wherein the rectifying means is connected between the demagnetizing coil and the energy storage member to cause the energy storage member to be unidirectionally charged in the successive cycles of the alternating current from the alternating current means and wherein the energy storage member is a capacitor.

6. The combination set forth in claim 5 wherein the rectifying means constitutes a full wave rectifier having a pair of input terminals connected in a circuit with the demagnetizing coil across the alternating current means and having a pair of output terminals connected in a circuit with the capacitor upon an engagement between the movable contact and the first stationary contact of the switch.

7. In combination for degaussing a television tube,
means for providing an alternating signal, a shadow mask disposed in contiguous relationship to the television tube, at least one demagnetizing coil disposed in magnetically coupled relationship to the shadow mask to introduce a magnetic flux of decaying alternating characteristics to the tube to demagnetize the tube, an energy storage member, rectifying means for converting the alternating signal to a form for unidirectionally charging the energy storage member and for producing the flow of an alternating current with decaying characteristics through the demagnetizing coil in accordance with the energy build-up in the energy storage member from such unidirectional charge, switching means having first and second operative conditions, means connecting the alternating signal means, the demagnetizing coil, the rectifying means, the switching means and the energy storage means in a first electrical interrelationship, in the first operative condition of the switching means, to produce the flow of the alternating current of decaying characteristics through the coil, discharge means, and means connecting the energy storage means, the switching means and the discharge means in a second electrical interrelationship, in the second operative condition of the switching means, to produce a discharge of the energy storage means through the discharge means.

8. The combination set forth in claim 7 wherein the energy storage member constitutes a capacitor and wherein the rectifying means include at least one unidirectional member and wherein the switching means has a pair of stationary contacts and a contact movable between the stationary contacts to provide the first and second operative relationships.

9. A circuit for degaussing a television tube, including, at least one demagnetization coil having first and second ends, a source of AC power coupled to the first end of the demagnetization coil, means for diminishing over a period of time the AC power through the demagnetization coil, said means including a rectifier means coupled to a second end of the demagnetization coil and further including a charge-storage member, means for discharging the charge-storage member, a switch having first and second operative positions, means connecting the charge-storage member and the rectifier means to the second end of the demagnetizing coil in the first position of the switch to provide for the flow of a decaying current to the charge-storage member, means connecting the charge-storage means to the discharging means in the second position of the switch for a discharge of the charge-storage means through the discharging means, and means including the switch for providing for a switching of the charge-storage device between the connection with said rectifier means and the second end of the demagnetization coil in the first position of the switch and the connection with said discharging means in the second position of the switch.

10. A circuit for degaussing a television tube, including, a shadow mask disposed in contiguous relationship to the tube, a demagnetizing coil having first and second terminals and disposed relative to the shadow mask to introduce magnetic flux to the tube, an AC source having a first terminal and a second terminal, the first terminal of the AC source being coupled to the first terminal of the demagnetizing coil, a diode bridge rectifier having first and second input terminals and first and second output terminals, the first input terminal of the diode bridge rectifier being coupled to the second terminal of the demagnetizing coil, the second input terminal of the rectifier being coupled to the second terminal of the AC source, a storage capacitor having first and second plates, the first plate of the storage capacitor being coupled to the first output terminal of the rectifier, a resistor having first and second terminals, the first terminal of the resistor being coupled to the first plate of the storage capacitor, a switch having first and second positions, said switch comprising means for switching the second plate of the storage capacitor between the second output terminal of the rectifier in the first position of the switch and the second terminal of the resistor in the second position of the switch.

11. A circuit for degaussing a television tube, including, a shadow mask disposed in contiguous relationship to the television tube, a demagnetizing coil having first and second terminals and disposed relative to the shadow mask to introduce magnetic flux to the tube, an AC source having a first terminal and a second terminal, the first terminal of the AC source being coupled to the first terminal of the demagnetizing coil, a diode-bridge rectifier having first and second input terminals and first and second output terminals, the first input terminal of the diode-bridge rectifier being coupled to the second terminal of the demagnetizing coil, the second input terminal of the diode-bridge rectifier being coupled to the second terminal of the AC source, a storage capacitor having first and second plates, the first plate of the storage capacitor being coupled to the first output terminal of the diode-bridge rectifier, a switch having a movable contact and first and second fixed contacts, the movable contact of the switch being coupled to the second plate of the storage capacitor, the first fixed contact of the switch being coupled to the second output terminal of the diode-bridge rectifier, and a resistor having first and second terminals, the first terminal of the resistor being coupled to the first plate of the storage capacitor, and the second terminal of the resistor being coupled to the second fixed contact of the switch.

12. A circuit for degaussing a television tube having a display face, at least one demagnetization coil mounted in proximity to the display face of the television tube to introduce a magnetic flux to the display face, an AC source of power, a power transformer having primary and secondary windings, the AC source being coupled across the primary winding of the transformer, the secondary winding having a first terminal and a second terminal, the first terminal of the secondary of the power transformer being coupled to the first end of the demagnetization coil, a rectifier having first and second input terminals and first and second output terminals, a first switch having first and second positions, the first input terminal of the rectifier being switchable by the first switch between a connection to the second end of the demagnetization coil in the first position of the switch and a connection to the first terminal of the secondary of the power transformer in the second position of the switch, the second input terminal of the rectifier being coupled to the second terminal of the secondary of the power transformer, a smoothing filter including at least one capacitor having first and second plates, the first plate of the capacitor being coupled to the first output terminal of the rectifier, and a second switch having first and second positions, the second switch being ganged to the first switch, the second plate of the capacitor being coupled to the second output terminal of the rectifier in the second position of the second switch and being decoupled from the second output terminal of the rectifier in the first position of the switch.

References Cited

UNITED STATES PATENTS

| | | | |
|---|---|---|---|
| 2,809,326 | 10/1957 | Gulnac et al. | 315—27 |
| 2,898,509 | 8/1959 | Clay et al. | 315—8 |
| 2,962,621 | 11/1960 | Fernald | 315—8 |
| 3,286,122 | 11/1966 | Dietch | 315—8 |

ROBERT SEGAL, *Primary Examiner.*